United States Patent [19]

Roos et al.

[11] Patent Number: 4,670,244

[45] Date of Patent: * Jun. 2, 1987

[54] PROCESS FOR REDUCING METAL IONS IN AQUEOUS SOLUTIONS

[75] Inventors: Wouter Roos, Nisse; Bernardus J. Damman, Middelburg; Arie Lagendijk, Oost-Souburg, all of Netherlands; Dieter Steidl; Raban von Schenck, both of Hofheim, Fed. Rep. of Germany

[73] Assignee: Hoechst Aktiengesellschaft, Fed. Rep. of Germany

[*] Notice: The portion of the term of this patent subsequent to Dec. 30, 2003 has been disclaimed.

[21] Appl. No.: 782,500

[22] Filed: Oct. 1, 1985

[30] Foreign Application Priority Data

Oct. 15, 1984 [DE] Fed. Rep. of Germany ....... 3437686

[51] Int. Cl.⁴ .............................................. B01D 21/01
[52] U.S. Cl. ................... 423/659; 210/757; 423/1; 423/3; 423/53; 423/62; 423/69; 423/99; 423/138; 423/321 R; 423/488; 423/531
[58] Field of Search ...................... 423/321 R, 1, 3, 53, 423/62, 69, 99, 138, 488, 531, 659; 210/719, 720, 757, 912

[56] References Cited

U.S. PATENT DOCUMENTS

| | | | |
|---|---|---|---|
| 1,633,621 | 6/1927 | Blumemfeld | 210/719 |
| 2,127,450 | 8/1938 | Schneider et al. | 210/718 |
| 3,294,680 | 12/1966 | Lancy | 210/720 |
| 3,421,845 | 1/1969 | Peterson | 423/184 |
| 3,536,619 | 10/1970 | Urban et al. | 210/718 |
| 3,770,630 | 11/1973 | Kamperman | 210/719 |
| 3,857,704 | 12/1974 | Coulter | 210/719 |
| 3,901,805 | 8/1975 | Stewart | 210/720 |
| 4,053,562 | 10/1977 | Harnisch et al. | 423/321 R |
| 4,108,769 | 8/1978 | Krieg et al. | 210/720 |
| 4,146,575 | 3/1979 | Gallistru et al. | 423/321 R |
| 4,147,757 | 4/1979 | Richards et al. | 423/313 |
| 4,159,309 | 6/1979 | Faul et al. | 210/757 |
| 4,374,805 | 2/1983 | Worthington et al. | 423/321 R |
| 4,394,360 | 7/1983 | Schrodter et al. | 423/321 R |
| 4,485,078 | 11/1984 | Weston et al. | 423/321 R |
| 4,490,336 | 12/1984 | Worthington et al. | 423/321 S |

FOREIGN PATENT DOCUMENTS

| | | | |
|---|---|---|---|
| 22262 | 2/1976 | Japan | 210/719 |
| 51972 | 4/1979 | Japan | 210/720 |
| 89987 | 5/1983 | Japan | 210/757 |

OTHER PUBLICATIONS

European Patent Application No. 0097478 published Jan. 4, 1984.

Slack, *Phosphoric Acid*, vol. 1, Part II, Marcel Dekker, Inc. (1968), pp. 944–947.

*Primary Examiner*—John Doll
*Assistant Examiner*—Wayne A. Langel
*Attorney, Agent, or Firm*—Connolly and Hutz

[57] ABSTRACT

Metal ions are reduced from a higher to a lower oxidation stage using ferrophosphorus as the reductant.

5 Claims, No Drawings

PROCESS FOR REDUCING METAL IONS IN AQUEOUS SOLUTIONS

The present invention relates to a process for reducing metal ions from a higher to a lower oxidation stage with the use of a reductant in an aqueous solution.

It is generally known that metals which in aqueous solution may exist in form of ions of various oxidation stages can be reduced to a lower oxidation stage by means of a reductant.

The reductants which are commonly used include iron, e.g. in form of iron turnings or borings, zinc, aluminum, sulfides, sulfites, hydrazine etc.

A disadvantage of these known reductants resides in the fact that their efficiency depends on the acidity of the respective solution and that the metals give rise to the evolution of hydrogen.

We have now unexpectedly found that these adverse effects do not appear when ferrophosphorus is used as the reductant.

In order to increase the reduction velocity, it is good practice to use the ferrophosphorus in form of particles with a size smaller than 100 $\mu$m, preferably smaller than 10 $\mu$m. It is also possible to increase the reaction velocity by increasing the reaction temperature to more than 60° C.

A further technically beneficial effect resides in that the reduction can be carried out not only in an acid but also in a neutral or alkaline medium, even at a pH of 9 or more.

It is also an unexpected result which would not have been foreseen that ferrophosphorus permits a low redox potential of less than $-150$ mv to be established in crude phosphoric acid (45–50% $P_2O_5$), and that hydrogen is practically not evolved within the acid range where commonly employed standard reductants, e.g. iron turnings or borings or hydroxymethanesulfinate, have a redox potential of $+170$ mv as the end point.

The reduction in accordance with this invention can be effected, for example, in a hydrochloric, sulfuric or phosphoric acid medium.

The process of this invention can be used for reducing higher valence metal ions, e.g. ions of iron, vanadium, chromium or uranium alone or in admixture with each other or further ions.

The following Examples are intended to illustrate the process of this invention which is naturally not limited thereto.

| Ex. | Initial redox potential | Conc. of metal ions in feed material | Aqueous solution | Reductant in wgt % | Redox potential after reduction | Conc. of reduced metal ions |
|---|---|---|---|---|---|---|
| 1 | +830 mV | $Fe^{3+}$ 0.331%<br>$V^{5+}$ 426 ppm<br>$Cr^{6+}$ 389 ppm | HCl 12% | Ferrophosphorus 0.8% | −130 mV | $Fe^{2+}$ 0.607%<br>$Fe^{3+}$ 0.013%<br>$V^{5+}$ not detectable<br>$V^{4/3}$ 439 ppm<br>$Cr^{3+}$ 457 ppm |
| 2 | +618 mV | $V^{5+}$ 329 ppm | $H_2SO_4$ 75% | Ferrophosphorus 0.8% | +280 mV | $V^{5+}$ not detectable<br>$V^{\frac{3}{4}}$ 314 ppm |
| 3 | +490 mV | $V^{5+}$ 640 ppm<br>$Cr^{6/3}$ 589 ppm<br>$Fe^{3+}$ 0.28% | crude $H_3PO_4$ 65% | Ferrophosphorus 0.8% | −180 mV | $V^{3+}$ 620 ppm<br>$V^{5+}$ not detectable<br>$Cr^{6+}$ not detectable<br>$Fe^{2+}$ 0.61%<br>$Fe^{3+}$ < 0.003% |
| 4 | −384 mV | $V^{5+}$ 200 ppm<br>$Fe^{3+}$ 200 ppm | $Na_2HPO_4$ 36% pH~8.9 | Ferrophosphorus 0.05% < 10 $\mu$m | −780 mV | $Fe^{3+}$ $V^{5+}$ not detectable |
| 5 | +475 mV | $Fe^{3+}$ 0.225% + V + Cr | crude $H_3PO_4$ 66% | Na—hydroxymethane-sulfinate 0.8% | +220 mV | $Fe^{3+}$ 0.013% |

We claim:

1. A process for reducing metal ions from a higher to a lower oxidation stage by means of a reductant in an aqueous solution, which comprises using ferrophosphorus as the reductant.

2. The process as claimed in claim 1, wherein the ferrophosphorus substantially consists of particles having a size of less than 100 $\mu$m.

3. The process as claimed in claim 2, wherein the ferrophosphorus substantially consists of particles having a size of less than 10 $\mu$m.

4. The process as claimed in claim 1, wherein the reduction is effected at a temperature higher than 60° C.

5. The process as claimed in claim 1, wherein the reduction is effected in an acid, alkaline or neutral medium.

* * * * *